United States Patent
So (10) Patent No.: US 8,848,518 B2
(45) Date of Patent: Sep. 30, 2014

(54) SYSTEM AND METHOD FOR PROVIDING NOTIFICATION OF A CHANGE IN PATH CONDITION

(75) Inventor: Ning So, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 564 days.

(21) Appl. No.: 12/775,100

(22) Filed: May 6, 2010

(65) Prior Publication Data

US 2011/0274113 A1 Nov. 10, 2011

(51) Int. Cl.
*G01R 31/08* (2006.01)
*H04L 12/723* (2013.01)
*H04L 12/703* (2013.01)

(52) U.S. Cl.
CPC .............. *H04L 45/50* (2013.01); *H04L 45/28* (2013.01)
USPC ........... 370/228; 370/236; 370/217; 370/227; 370/242

(58) Field of Classification Search
None
See application file for complete search history.

(56) References Cited

U.S. PATENT DOCUMENTS

| | | | | |
|---|---|---|---|---|
| 7,076,688 B2* | 7/2006 | Yamamoto | ...................... | 714/6.1 |
| 7,336,615 B1* | 2/2008 | Pan et al. | ...................... | 370/248 |
| 7,380,017 B2* | 5/2008 | Weil et al. | ...................... | 709/239 |
| 7,508,755 B2* | 3/2009 | Liu | ...................... | 370/228 |
| 7,804,767 B1* | 9/2010 | Owens et al. | ...................... | 370/217 |
| 7,937,492 B1* | 5/2011 | Kompella et al. | ............. | 709/239 |
| 7,940,695 B1* | 5/2011 | Bahadur et al. | ............. | 370/254 |
| 7,974,183 B2* | 7/2011 | Li et al. | ...................... | 370/217 |
| 8,040,796 B2* | 10/2011 | Beauford | ...................... | 370/225 |
| 8,111,612 B2* | 2/2012 | Dziong et al. | ................. | 370/218 |
| 8,139,479 B1* | 3/2012 | Raszuk | ...................... | 370/228 |
| 8,165,028 B1* | 4/2012 | Yuhan et al. | .................. | 370/242 |
| 8,208,372 B2* | 6/2012 | Vasseur et al. | ................ | 370/225 |
| 2003/0147346 A1* | 8/2003 | Kanakubo | ...................... | 370/227 |
| 2005/0007950 A1* | 1/2005 | Liu | ...................... | 370/221 |
| 2007/0159961 A1* | 7/2007 | Zhai | ...................... | 370/217 |
| 2007/0286069 A1* | 12/2007 | Xu | ...................... | 370/218 |
| 2008/0019265 A1* | 1/2008 | Alluisi et al. | ................. | 370/225 |
| 2008/0046589 A1* | 2/2008 | Lu et al. | ...................... | 709/238 |
| 2008/0304407 A1* | 12/2008 | Umansky et al. | ............. | 370/222 |
| 2009/0086644 A1* | 4/2009 | Kompella et al. | ............. | 370/248 |
| 2009/0113070 A1* | 4/2009 | Mehta et al. | .................. | 709/238 |
| 2009/0185495 A1* | 7/2009 | Zi | ...................... | 370/244 |
| 2010/0177631 A1* | 7/2010 | Chen et al. | .................... | 370/221 |
| 2010/0238788 A1* | 9/2010 | Boutros et al. | ................ | 370/216 |

* cited by examiner

Primary Examiner — Hassan Phillips
Assistant Examiner — Hicham Foud (57) ABSTRACT

An approach is provided for notifying a change in path condition. A change in condition of a label switched path connecting a first node and second node is detected. A notification message is generated for transmission to the first node. The notification message specifies information related to the detected change according to a predetermined format that can be processed by the first node.

19 Claims, 8 Drawing Sheets

SYSTEM AND METHOD FOR PROVIDING NOTIFICATION OF A CHANGE IN PATH CONDITION

BACKGROUND INFORMATION

With the increase in demand for broadband communications and services, telecommunication service providers are in a constant state of flux to provide the fastest and most reliable service to their customers. Not surprisingly, a vast interconnection of networks have emerged to support these services. Any disruption in the communication paths between network nodes results in packet loss, latency, or delay, causing slow service as well as intermittent interruptions of service to customers. Traditionally, conveying path condition information, if even possible, consumes a large amount of network resources and time. Consequently, the cost of such mechanism may outweigh its benefit. Additionally, the information may be stale, as network conditions can be very dynamic.

Therefore, there is a need for an approach that provides for effective and efficient notification of a change in path conditions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing notification of a change in path condition are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to networks that carry data packets using Multi-protocol Label Switching (MPLS) technology, it is contemplated that various exemplary embodiments are applicable to other equivalent systems and traffic flows.

Figure 1:
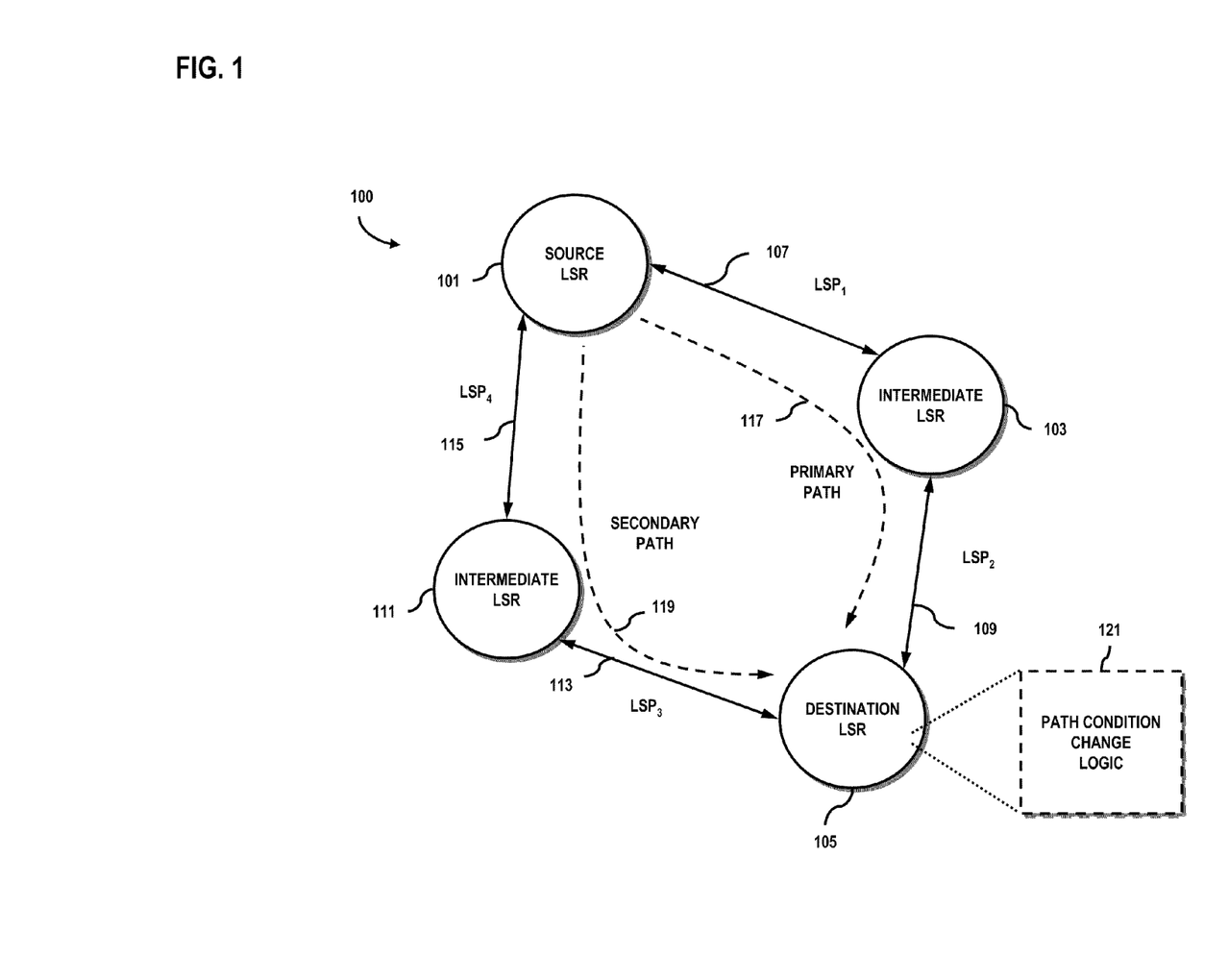
FIG. 1 is a diagram of a system configured to provide notification of a change in path condition, according to an exemplary embodiment.

FIG. 1 is a diagram of a system configured to facilitate path condition change notification, according to an exemplary embodiment. It is recognized that nodes in a network need to be rapidly notified of failures or changes in conditions/states so that redundancies (if any) built into the network can be immediately activated and service restored to the customers. For the purposes of illustration, a communication system 100 for providing path condition change notification is described with respect to communication paths of a packet-switched infrastructure. In particular, certain embodiments are explained in the context of Multiprotocol Label Switching (MPLS) technology. This technology is based on setting up virtual paths between nodes in a network. MPLS provides high speed transfer of packets over data networks by appending labels to packets that contain information related to the path that the data packet will take to reach its destination. This eliminates the need for routers to examine the header of each packet, resulting in the faster delivery of packets to their destination. Even though various technologies such as MPLS predominantly support fast delivery of packets, the characteristics and construction of the physical network infrastructure plays an equally vital role.

Moreover, it is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems). Routing protocols, such as open-shortest path first (OSPF) and intermediate system to intermediate system (IS-IS), are utilized to determine MPLS traffic flow routes through the network, as well as govern the distribution of routing information between nodes of the network(s).

In certain embodiments, system 100 includes a communication node, such as a source Label Switched Router (LSR) 101, that forwards MPLS packets to an intermediate node, i.e., LSR 103, by examining the label of the packets over a Label Switched Path ($LSP_1$) 107. The intermediate LSR 103 similarly forwards the packets to the destination LSR 105 over $LSP_2$ 109. In an alternative embodiment, more than one intermediate LSR may be present along the path that the packet travels. Hence, the path may comprise multiple segments (e.g., more than two segments). Also, there may not be any intermediate LSRs along the path between the source LSR 101 and the destination LSR 105; and the packets may instead travel along a single network segment. It is contemplated that other arrangements or topologies may be utilized by system 100. Furthermore, the paths 107 and 109 may include both wired (e.g., coaxial cable, twisted pair, fiber optic cable, etc.) as well as wireless connections.

Under the scenario of FIG. 1, the route that encompasses the $LSP_1$ 107 and $LSP_2$ 109 is designated as the primary path 117, which handles the traffic under normal operations. Physical conditions on this primary path may change unexpectedly at any given time. Such changes may include, for instance, a break in a fiber optic link, increased noise in the environment of a metallic cable or wireless system, a sudden drift of a satellite, equipment failure, etc. Under these new operating conditions, system 100 is capable of informing the source node 101 of such change via a notification message that specifies information related to the detected change. By contrast, conventional approaches do not permit such detailed knowledge of the networking environment.

Source LSR 101 may determine that the new conditions may not be favorable for continuing to send the data along the primary path 117, and consequently may decide to use an alternative path for the data packets. This alternative, i.e., secondary, path 119 can include LSP$_3$ 113, intermediate LSR 111 and LSP$_4$ 115. As with the primary path 117, more than one intermediate LSR may be present along the secondary path 119, and thus, may include a number of segments. As with the primary path 117, there may not be any intermediate LSRs along the secondary path between the source LSR 101 and the destination LSR 105. Furthermore, the packets may travel along a single network segment.

According to certain embodiments, a path condition change logic 121 can detect the changes in path conditions, and notify the appropriate nodes 101, 103, 105, and 111 of such condition. The path condition change logic 121 can reside, in one embodiment, any network node or element within system 100, so long as the logic 121 can determine the subject path's condition. In the example of FIG. 1, destination LSR 105 possesses the path condition change logic 121; however, it is contemplated that the path condition change logic 121 can also be a standalone platform or be integrated with a network management system.

Upon receiving information about the change in link condition or state, source LSR 101 can alter the route of the primary path 117, which can involve selecting over transmission media. Additionally, source LSR 101 can elect to switch the traffic over the secondary path 119. In certain embodiments, the information about the link condition is provided using an MPLS echo request and reply exchange, which is detailed below with respect to FIGS. 2, 3 and 5. A sub-Type Length Value (TLV) is defined to indicate the change of conditions of a downstream link within the MPLS echo reply.

The process of network condition notification is further described below.

Figure 2:
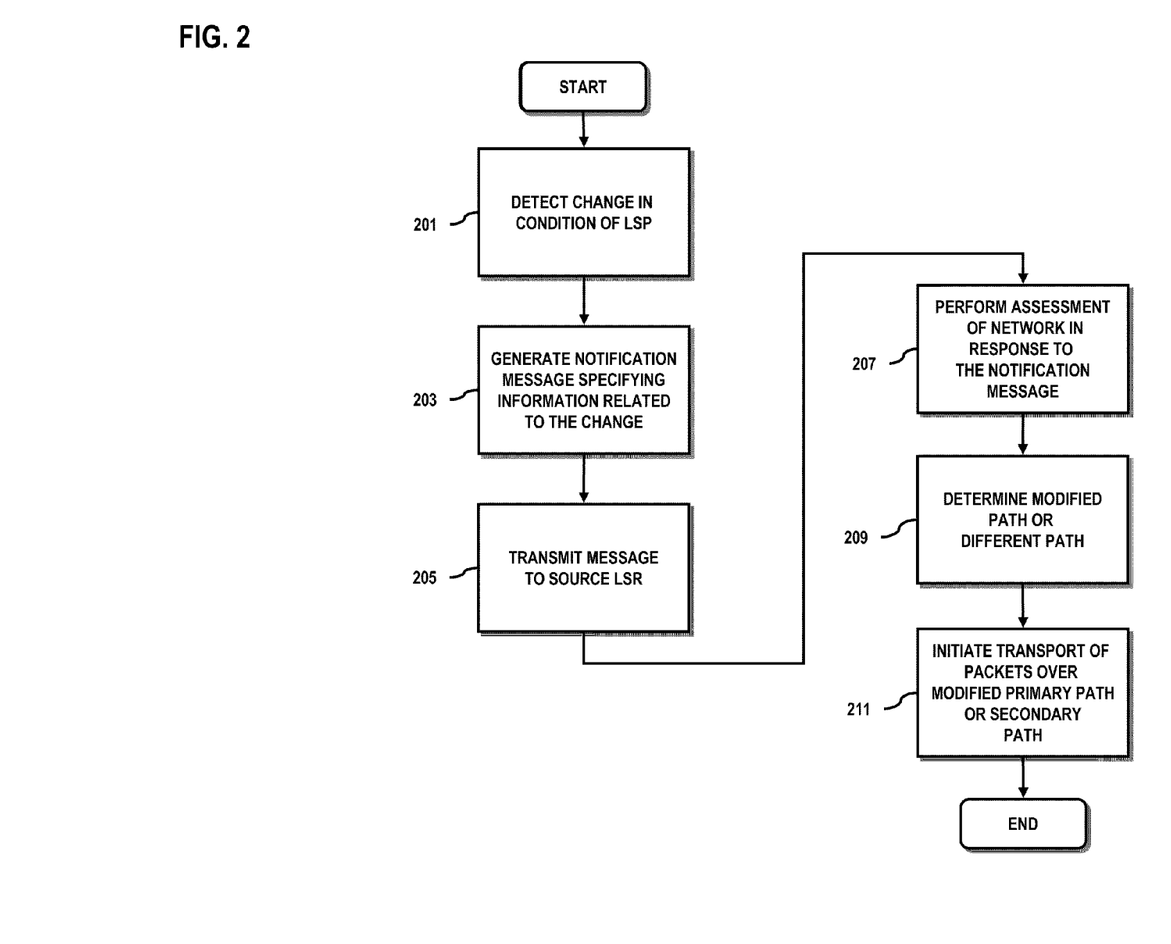
FIG. 2 is a flowchart of a process for providing notification of a change in path condition, according to an exemplary embodiment.

FIG. 2 is a flowchart of a process for providing notification of a change in path condition, according to an exemplary embodiment. In this example, source LSR 101 can be alerted of any change in network conditions that can affect network performance and/or end-user experience. By way of example, this process is executed by path condition change logic 121 to detect and report any change in link condition supporting one or more communication nodes within system 100. When degradation in performance of a specific downstream path occurs, as detected by logic 121 within destination LSR 105 (per step 201), logic 121 generates, as in step 203, a notification message specifying information related to the change—e.g., a reduction in network performance or change in transmission media. In step 205, the message is forwarded to source LSR 101. Performance degradation may stem from a variety of reasons; such reduction can be directly related to, for example, the transmission media, the environmental characteristics of the transmission channel, or equipment failure. In one example, if packets are physically carried along a fiber optic link and there is a break in the link or another type of fault, the path may not be able to support the transmission of these packets. The decline in performance may be detected by various entities in the network 100 including the source LSR 101, destination LSR 105 or another entity (depending on where the path condition change logic 121 is implemented).

Figure 3:
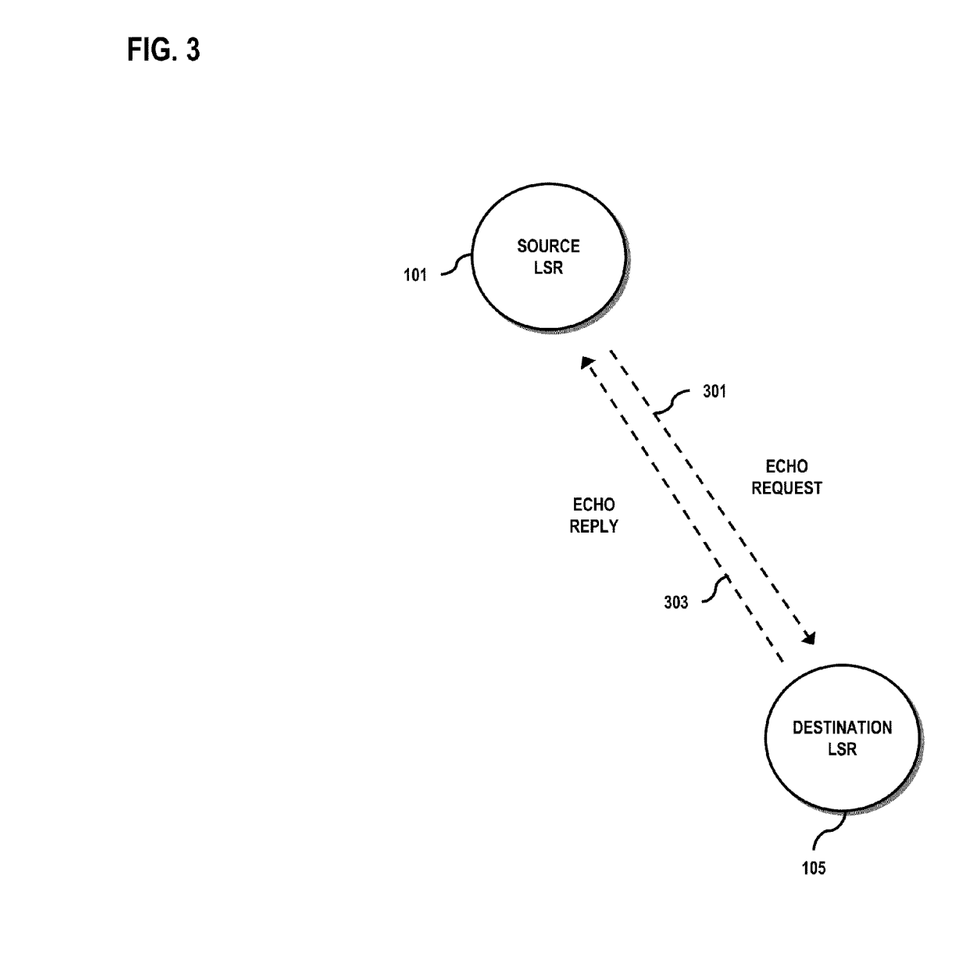
FIG. 3 is a diagram of a Multiprotocol Label Switching (MPLS) ping process used to convey path change condition information, according to an exemplary embodiment.

In step 207, source LSR 105 performs an assessment of the network conditions in response to the notification message; this assessment can involve the transmission of a MPLS ping, as described with respect to FIG. 3). Based on the assessment, in step 209, source LSR 105 can determine a modified path or a different path (e.g., over a secondary path 119) to route the packets. The modification of the path may involve replacement of physical wiring or equipment, re-routing of the communication path over other physical or virtual circuits, or a combination thereof. Thereafter, transport of the packets can proceed over the modified primary path or the secondary path 119, per step 211.

Although the above process is described with respect to degradation in performance of a link, it is contemplated that any change in link condition (even an improvement in performance) can be detected to create a modified path. For instance, if the path is temporarily traversing a new link that is more costly (because it is the only available link) but in fact improves performance, the change may not be desirable if incurring such costs can be avoided with other paths.

FIG. 3 is a diagram of a Multiprotocol Label Switching (MPLS) ping process, according to an exemplary embodiment. As mentioned, to evaluate or assess the network condition, the source LSR 101 may transmit an echo request (i.e., MPLS ping) to the destination LSR 105 and wait for an echo reply. The echo reply, according to certain embodiments, can specify information on the particular changes of the path conditions, such as a reduction in link performance or a change of the transport media.

This example depicts the transmission of a downstream echo request 301, and the reception of an echo reply 303 by the source LSR 101. Upon obtaining information on the link condition based on the echo reply 303, the source LSR 101 can assess whether to perform such functions as enforce admission control, re-signal or re-compute the downstream paths, or even generate more stringent performance monitoring criteria (at shorter intervals of time). That way, the source LSR 101 ensure that service is minimally disrupted on the network 100.

Once a determination on how to proceed in light of the condition change is made by the source LSR 101, traffic may be routed to the destination LSR 105 over the "best" transmission approach that the LSR 101 has determined. Alternatively, source LSR 101 may make this determination using the feedback on the link condition, along with other considerations—e.g., service level agreement (SLA), quality of service (QoS), etc. associated with the traffic.

Figure 4:
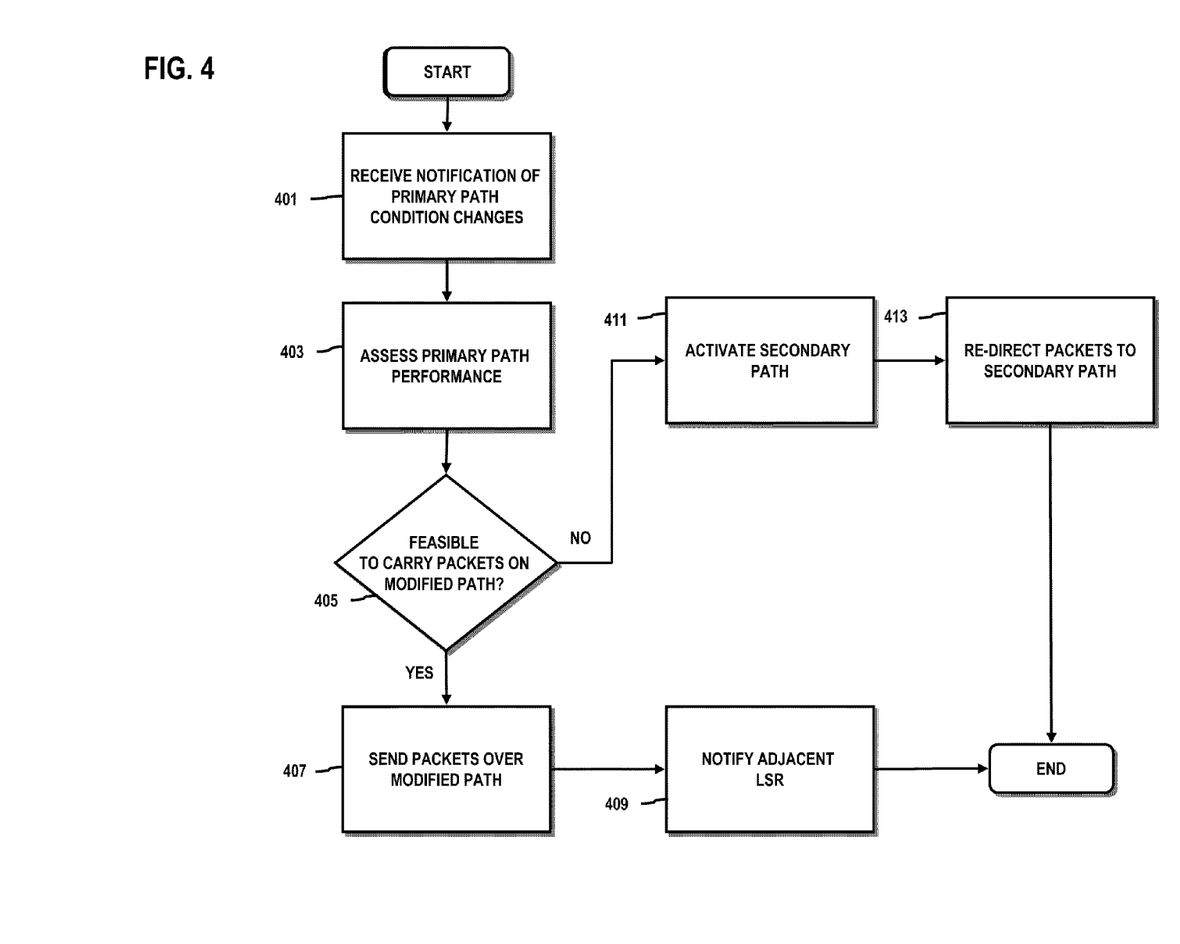
FIG. 4 is a flowchart of a process for selecting a communication path involving use of a redundant path, according to an exemplary embodiment.

FIG. 4 is a flowchart of a process for selecting a communication path involving use of a redundant path, according to an exemplary embodiment. As mentioned, network 100 can pre-designated multiple paths for redundancy purposes: a primary path 117, and a secondary path 119 that is activated upon unavailability of the primary path 117. However, because of varying link conditions, it may not be feasible to default to the secondary path 119 under certain circumstances. In the example of FIG. 4, a process is provided to address these circumstances. In step 401, source LSR 101 receives notification of a path condition change along the primary path 117. As explained in FIG. 3, this information can be obtained through an echo request/reply sequence. Next, the primary path 117 is assessed, as in step 403, with respect to performance in view of the received information about the path condition change. Once the primary path performance is evaluated, source LSR 101 can make a determination as to whether the secondary path 119 should be activated or continue to send traffic along a modified primary path.

In certain instances, it may not be feasible or effective to continue to use the modified primary path. For example, if the physical transmission media of one or more of the LSPs within the primary path 117 has changed from a fiber optic cable to a wireless connection (such as a microwave link), it may not be desirable to use this modified path due to other concerns, e.g., security. If security factors have a higher priority over strict performance parameters, source LSR 101 would prefer not to transmit packets wirelessly (i.e., over such a modified link), if such link is not secured because of the over-the-air transmission.

If source LSR 101 elects not to continue use of the modified primary path (as in step 405), source LSR 101 can activate the secondary path 119, per step 411, and redirect traffic to this secondary path 119 (as in step 413). If, on the other hand, source LSR 101 determines that it is indeed feasible to use the modified version of the primary path 117, the modified primary path 117 is used to transport the traffic, as in step 407. In one embodiment, source LSR 101 may also notify an adjacent LSR 103 or LSR 111 about changed link condition, per step 409. In this manner, the adjacent LSR 103 and/or 111 can adapt accordingly. For example, such notification can be implemented using Ethernet Local Management Interface (E-LMI), Institute for Electrical and Electronics Engineers (IEEE) 802.3ah, or simple flow control.

The described processes and arrangements, according to certain embodiments, advantageously permit more efficient use of valuable network resources, while factoring in subscribers' networking requirements (e.g., QoS, SLA, etc.).

Figure 5A:
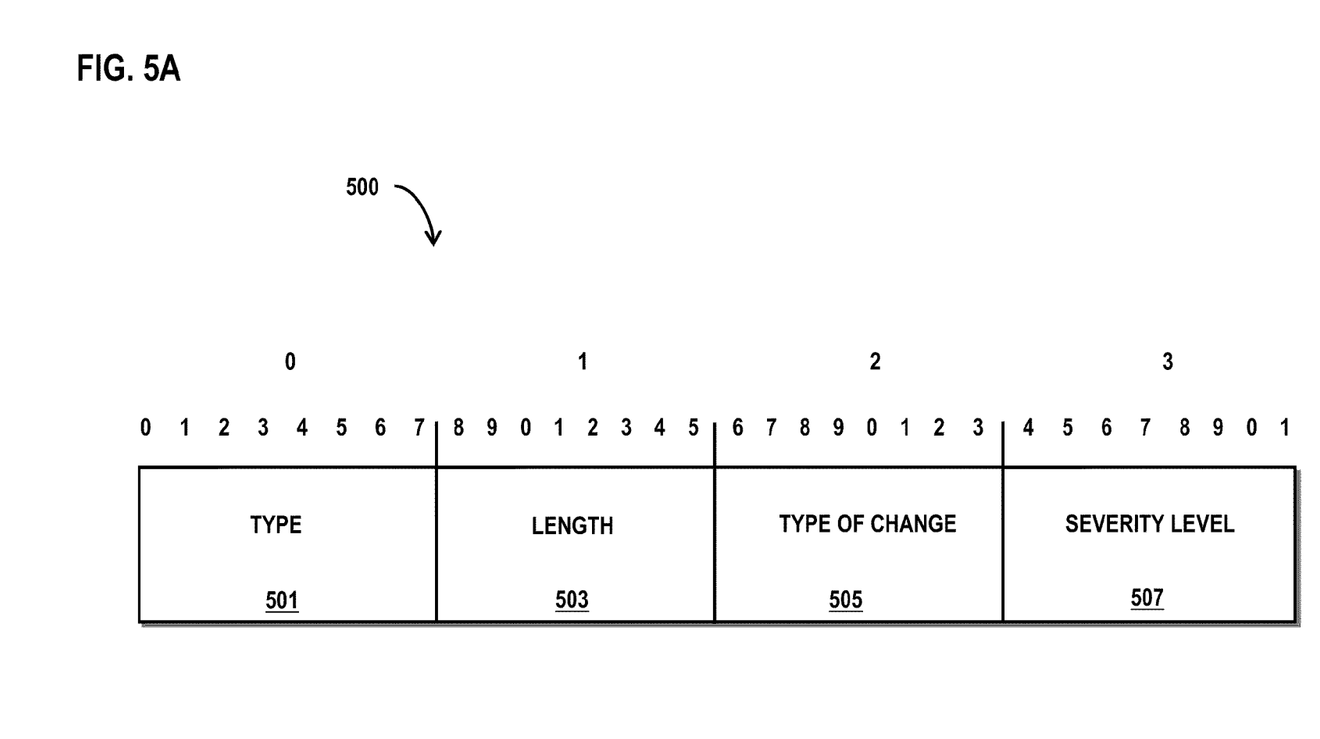
FIGS. 5A and 5B are diagrams of message formats for providing notification of a change in path condition, according to an exemplary embodiment.
Figure 5B:
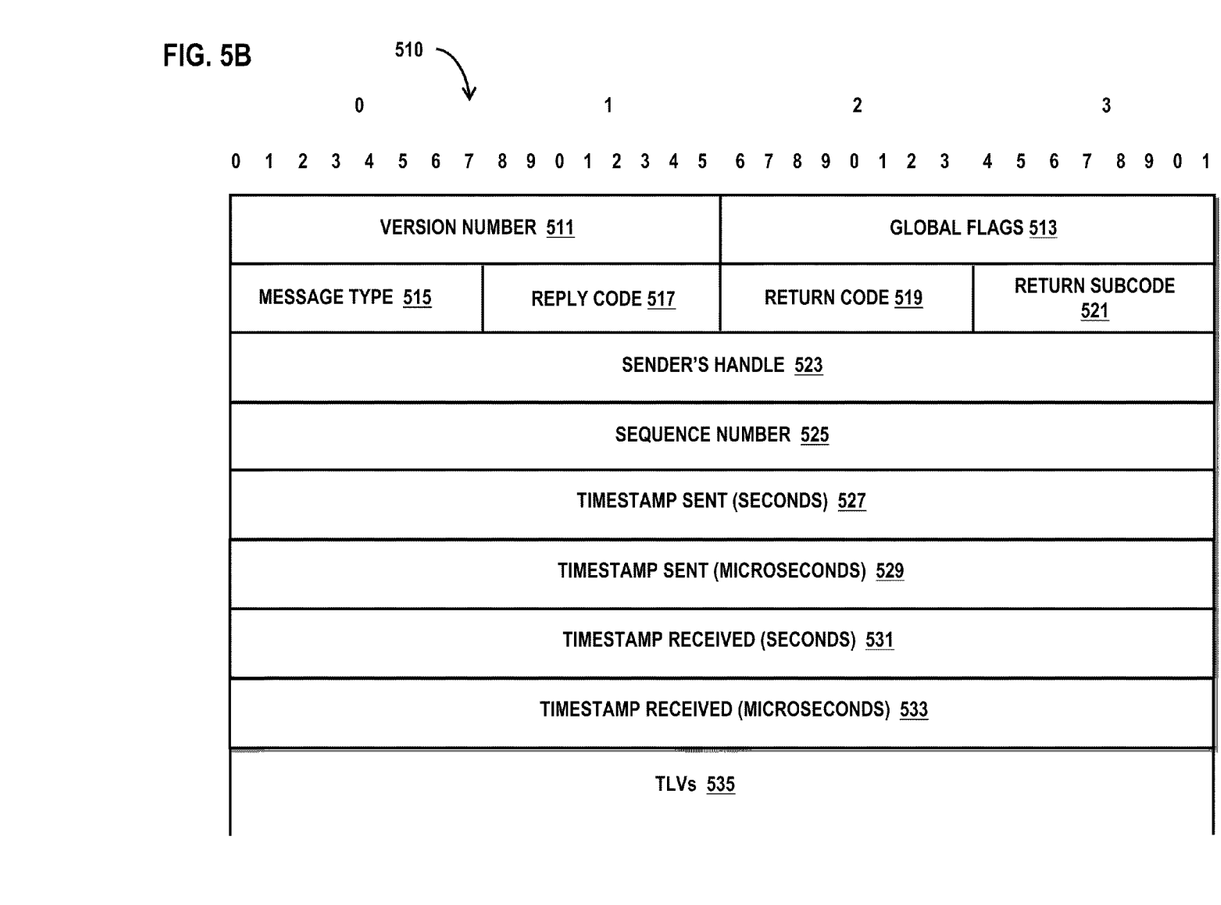

FIGS. 5A and 5B are diagrams of message formats for providing notification of a change in path condition, according to an exemplary embodiment. In particular, FIG. 5A illustrates a diagram of a sub-Type Length Value (TLV) format for a notification message, according to an exemplary embodiment. For purposes of illustration, information regarding a change in path condition can be specified in message having a sub-Type Length Value (TLV) format. The echo reply message of FIG. 3 can utilize this format in notifying the source LSR 101 of changes in path conditions. The addition of this sub-TLV within the echo reply enables the minimal usage of network resources for system 100. As shown, the sub-TLV format 500 includes four main entries: Type field 501, Length field 503, Type of Change field 505 and Severity Level field 507. In one embodiment, each of the fields 501-507 is one byte in length. According to one embodiment, the Type of Change field 505 can have the following values: "1" indicating that performance of the downstream link is reduced; or "2" signifying that the transmission media of the downstream link has been changed. These values may be used by the source LSR 101 to determine which path to use, as described within the context of FIG. 4. It is contemplated that other values can be specified to indicate other reasons for the path change condition—e.g., equipment failure, etc. The severity level field 507 specifies two or more values indicating the extent or degree of the change in the condition; these values can be predefined by a service provider (or subscriber) of the network 100, for example, to relate to the degree of impact on the link—e.g., ranging from minimal to critical.

Furthermore, in one embodiment, format 500 can be employed with a message having the format of FIG. 5B.

FIG. 5B depicts an MPLS echo message that can accommodate the fields defined by FIG. 5A to support notification of a path condition change. As shown, message format 510 can be an Internet Protocol (IP) User Datagram Protocol (UDP) packet with the fields defined in Table 1, as follows:

TABLE 1

| Field | Description |
| --- | --- |
| Version Number 511 | Value representing version of the protocol. |
| Global Flags 513 | Bit vector relating to performance of Forward Error Correction (FEC) stack validation. |

TABLE 1-continued

| Field | Description |
| --- | --- |
| Message Type 515 | Specifies message to be either an MPLS echo request or a reply. |
| Reply Code 517 | Specifies whether to reply and format of reply (if reply is to be sent) |
| Return Code 519 | Value set to zero by sender. |
| Return Subcode 521 | Value set by receiver; specifies point in the label stack where processing ceased. |
| Sender's Handle 523 | Value supplied by sender and returned unchanged by the receiver in an echo reply |
| Sequence Number 525 | Assigned by sender of echo request; can be used to determine missing reply messages |
| Timestamp Sent 527 | Time in seconds when the request was sent. |
| Timestamp Sent 529 | Time in microseconds when the request was sent. |
| Timestamp Received 531 | Time in seconds when the reply was received. |
| Timestamp Received 533 | Time in microseconds when the reply was received. |
| TLVs 535 | Type-Length-Value tuples. |

Details of the TLV mechanism is more fully described in Internet Engineering Task Force (IETF) Request for Comment (RFC) 4379, which is incorporated herein by reference in its entirety.

Table 2 enumerates exemplary Types and Values:

TABLE 2

| Type | Value Field |
| --- | --- |
| 1 | Target FEC stack |
| 2 | Downstream Mapping |
| 3 | PAD |
| 4 | Not assigned |
| 5 | Vendor Enterprise Number |
| 6 | Not assigned |
| 7 | Interface and Label Stack |
| 8 | Not assigned |
| 9 | Errored TLVs |
| 10 | Reply Type of Service (TOS) Byte |

The processes described herein for performing path change condition notification may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
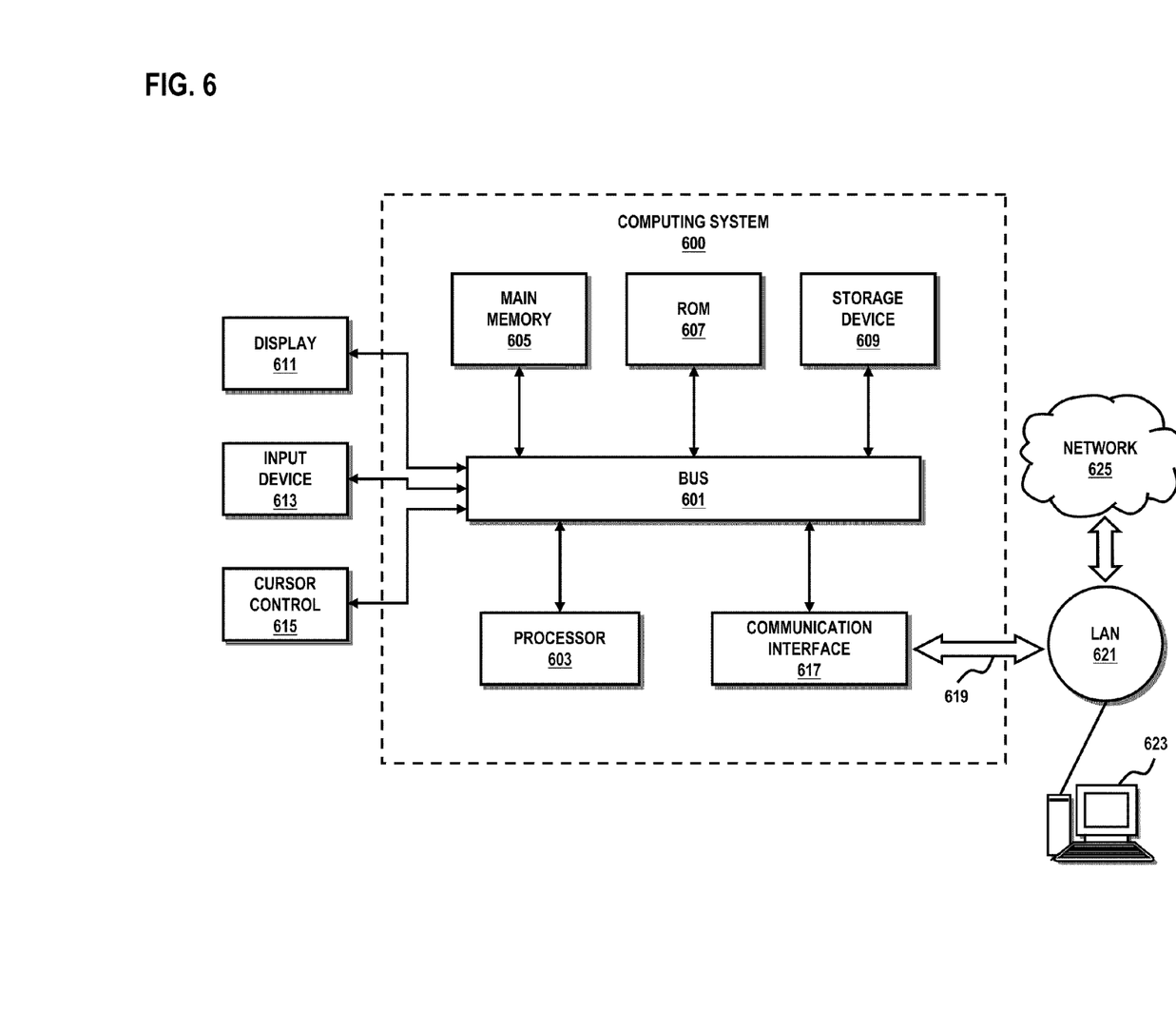
FIG. 6 is a diagram of a computer system that can be used to implement various exemplary embodiments.

FIG. 6 illustrates computing hardware (e.g., computer system) 600 upon which exemplary embodiments can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an exemplary embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement exemplary embodiments. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
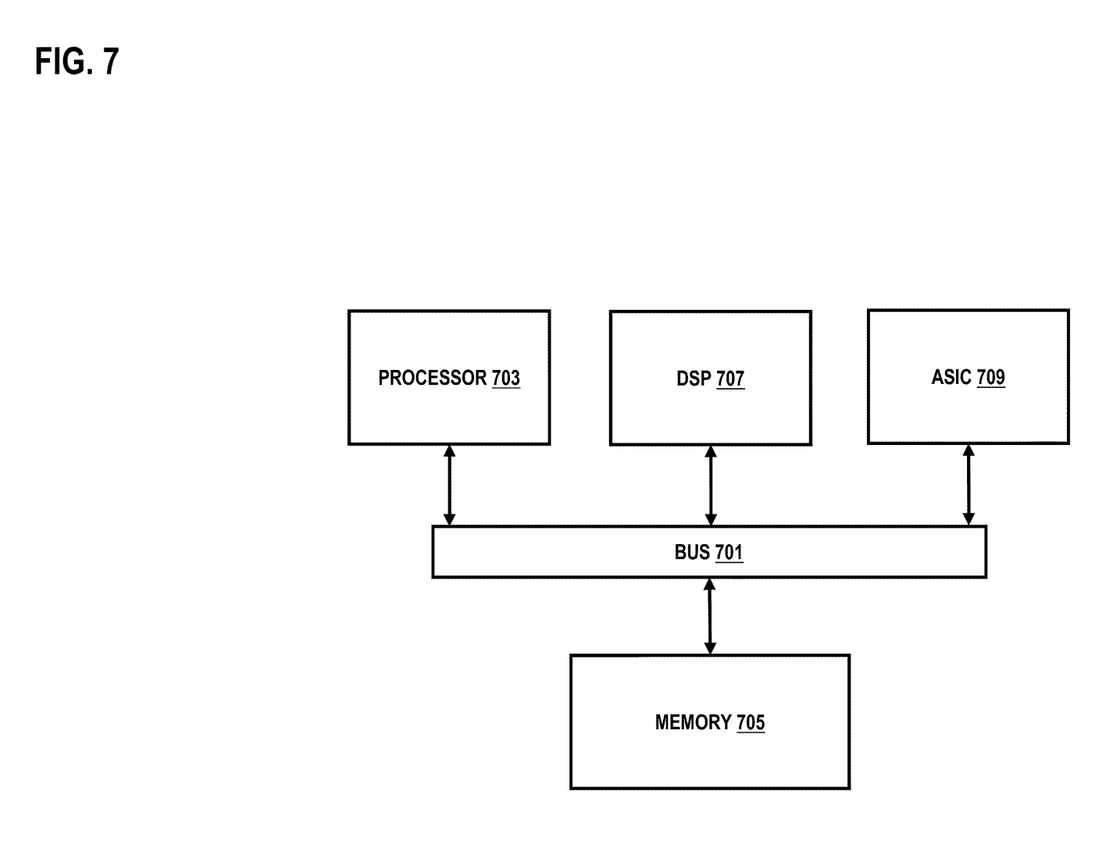
FIG. 7 is a diagram of a chip set that can be used to implement various exemplary embodiments.

FIG. 7 illustrates a chip set 700 upon which an embodiment of the invention may be implemented. Chip set 700 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIGS. 2 and 4.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to providing notification of a change in path condition. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting a change in condition of a primary label switched path connecting a first node and second node;
    generating a notification message for transmission to the first node;
    generating at the first node, in response to the notification message, an assessment message for transmission to the second node along the primary label switched path;
    determining whether to perform, at the first node, an admission control, a performance monitoring at shorter time intervals, or a combination thereof, based on a response to the assessment message;
    assessing a performance of the primary label switched path; and
    determining, based on the performance, whether to continue utilizing the primary label switched path or to activate a secondary label switched path associated with the primary label switched path,
    wherein the notification message specifies information related to the detected change according to a predetermined format that can be processed by a source node of the primary label switched path.

2. A method according to claim 1, wherein the primary label switched path is modified in response to the notification message.

3. A method according to claim 1, wherein the predetermined format includes,
    a type of change field for indicating the change in condition, the type of change field having a first value specifying reduction in performance of a downstream node that is downstream from the first node, or a second value specifying change of a transport media of the primary label switched path.

4. A method according to claim 3, wherein the predetermined format further includes a severity field for indicating degree of change in the condition.

5. A method according to claim 3, wherein the predetermined format is compatible with an internet protocol (IP) user datagram protocol (UDP) packet, and the notification message is an Multiprotocol Label Switching (MPLS) message.

6. A method according to claim 1, wherein the first node and the second node are label switched routers.

7. A method according to claim 1, wherein the first node is either the source node or an intermediate node along the primary label switched path.

8. A method according to claim 1, further comprising:
    determining to activate the secondary label switched path based on a comparison of the assessed performance with one or more security factors associated with the primary label switched path.

9. An apparatus comprising:
    at least one processor; and
    at least one memory including computer program code for one or more programs,
    the at least one memory and the computer program code configured to, with the at least one processor, cause the apparatus to perform at least the following:
    detect a change in condition of a primary label switched path connecting a first node and second node;
    generate a notification message for transmission to the first node;
    generate at the first node, in response to the notification message, an assessment message for transmission to the second node along the primary label switched path; and
    determine whether to perform, at the first node, an admission control, a performance monitoring at shorter time intervals, or a combination thereof, based on a response to the assessment message,
    wherein the notification message specifies information related to the detected change according to a predetermined format that can be processed by a source node of the primary label switched path and the first node performs an assessment of the primary label switched path in response to the notification message.

10. An apparatus according to claim 9,
    wherein the label switched path is modified in response to the notification message.

11. An apparatus according to claim 9, wherein the predetermined format includes,
    a type of change field for indicating the change in condition, the type of change field having a first value specifying reduction in performance of a downstream node that is downstream from the first node, or a second value specifying change of a transport media of the primary label switched path.

12. An apparatus according to claim 11, wherein the predetermined format further includes a severity field for indicating degree of change in the condition.

13. An apparatus according to claim 11, wherein the predetermined format is compatible with an internet protocol (IP) user datagram protocol (UDP) packet.

14. An apparatus according to claim 9, wherein the first node and the second node are label switched routers, and the notification message is an Multiprotocol Label Switching (MPLS) message.

15. An apparatus according to claim 9, wherein the first node is either the source node or an intermediate node along the primary label switched path.

16. A method comprising:
receiving, at a first node, a notification message specifying information related to a detected change of a condition of a primary label switched path connecting the first node to a second node, wherein the notification message has a predetermined format that can be processed by a source node of the primary label switched path;
generating at the first node, in response to the notification message, an assessment message for transmission to the second node along the primary label switched path;
determining whether to perform, at the first node, an admission control, a performance monitoring at shorter time intervals, or a combination thereof, based on a response to the assessment message;
assessing a performance of the primary label switched path;
determining, based on the performance, whether to continue utilizing the primary label switched path or to activate a secondary label switched path associated with the primary label switched path for redundancy; and
initiating, by the first node, a modification of the primary label switched path in response to the notification message.

17. A method according to claim 16, wherein the predetermined format includes,
a type of change field for indicating the change in condition, the type of change field having a first value specifying reduction in performance of a downstream node that is downstream from the first node, or a second value specifying change of a transport media of the primary label switched path, and
a severity field for indicating degree of change in the condition.

18. An apparatus comprising:
at least one processor; and
at least one memory including computer program code for one or more programs,
the at least one memory and the computer program code configured to, with the at least one processor, cause the apparatus to perform at least the following:
receive a notification message specifying information related to a detected change of a condition of a primary label switched path connecting a first node to a second node, wherein the notification message has a predetermined format that can be processed by a source node of the primary label switched path;
generate at the first node, in response to the notification message, an assessment message for transmission to the second node along the primary label switched path;
determine whether to perform, at the first node, an admission control, a performance monitoring at shorter time intervals, or a combination thereof, based on a response to the assessment message;
assess a performance of the primary label switched path;
determine, based on the performance, whether to continue to utilize the primary label switched path or to activate a secondary label switched path associated with the primary label switched path; and
initiate a modification of the primary label switched path in response to the notification message.

19. An apparatus according to claim 18, wherein the predetermined format includes,
a type of change field for indicating the change in condition, the type of change field having a first value specifying reduction in performance of a downstream node that is downstream from the first node, or a second value specifying change of a transport media of the primary label switched path, and
a severity field for indicating degree of change in the condition.

* * * * *